United States Patent [19]

Ohtsu et al.

[11] 4,364,428
[45] Dec. 21, 1982

[54] AUTOMATIC AIR-CONDITIONING APPARATUS

[75] Inventors: Eiichi Ohtsu, Katsuta; Takanori Shibata, Hitachi, both of Japan

[73] Assignee: Hitachi, Ltd., Tokyo, Japan

[21] Appl. No.: 204,519

[22] Filed: Nov. 6, 1980

[30] Foreign Application Priority Data

Nov. 9, 1979 [JP] Japan .............................. 54-144452
Mar. 19, 1980 [JP] Japan .............................. 55-34074

[51] Int. Cl.³ ...................... F25B 49/00; G05D 23/00
[52] U.S. Cl. .................................... 165/11 R; 62/127; 236/94
[58] Field of Search ............. 236/46 R, 94; 165/11 R; 62/126, 127; 364/112, 557; 219/506

[56] References Cited

U.S. PATENT DOCUMENTS

4,161,782 7/1979 McCracken ................... 364/112 X
4,181,957 1/1980 Pinckaers ........................... 364/557
4,206,872 6/1980 Levine ............................. 236/46 R
4,235,368 11/1980 Neel ..................................... 236/94

Primary Examiner—William E. Wayner
Attorney, Agent, or Firm—Antonelli, Terry & Wands

[57] ABSTRACT

An automatic air-conditioning apparatus, especially suitable for air-conditioning of an automotive vehicle, comprises a microcomputer controlling the air-conditioning operation and a temperature display element selectively displaying an internal air temperature of the vehicle compartment sensed by an air temperature sensor and a temperature setting set by a temperature setting unit. The temperature display element displays normally the internal air temperature but displays the temperature setting for a predetermined period of time only when the temperature setting unit is manipulated. In the main control flow including the steps of air-conditioning control and temperature display stored in the microcomputer, an interrupt routine is periodically run for the purpose of analog data processing requiring a relatively long period of time, so that the microcomputer can efficiently carry out other controls.

10 Claims, 7 Drawing Figures

AUTOMATIC AIR-CONDITIONING APPARATUS

BACKGROUND OF THE INVENTION

This invention relates to automatic air-conditioning apparatus, and more particularly to an automatic air-conditioning apparatus in which a microcomputer is used to control the internal temperature of the compartment of an automotive vehicle.

A conventional automatic air-conditioning apparatus for an automotive vehicle includes a blower motor for selectively drawing in internal air of the vehicle compartment or external air, an evaporator for removing moisture from the intake air and a hot-water heater for heating the dehumidified air. Various air distributing doors such as an air intake door, an air mixing door, a vent door, a bypass door and a floor door are suitably actuated to carry out desired conditioning of air thereby supplying conditioned air into the compartment of the vehicle. These doors are individually actuated by associated actuators controlled by a negative pressure or vacuum. These actuators are connected to a vacuum tank through a vacuum supply piping system and a vacuum selector. The control system of the conventional automatic air-conditioning apparatus includes a temperature controller controlling the internal temperature of the vehicle compartment in response to output signals from a compartment air temperature sensor, an external air temperature sensor, a temperature setting unit, a temperature-control feedback potentiometer and a mode selector selecting the system operation mode. The temperature controller controls a power servo for controlling the opening of the air mixing door, and it also controls the vacuum selector through the power servo. The vacuum selector selects the actuators to be driven, and the associated doors are actuated to control the internal temperature of the vehicle compartment.

However, the prior art automatic air-conditioning apparatus having such a construction has required a plurality of vacuum supply pipes resulting in a complex system construction due to the fact that all the doors are controlled by the vacuum supplied from the vacuum tank. Further, a temperature monitor for displaying a selected temperature setting has not been provided although a unit for setting the inernal temperature of the vehicle compartment (the internal air temperature) has been provided. The prior art automatic air-conditioning apparatus has not been capable of directly showing the actual temperature of internal air although an approximate value of such a temperature can be predicted, since a temperature monitor for displaying the internal temperature of the vehicle compartment is not provided. The prior art automatic air-conditioning apparatus has therefore been defective in that inconveniences are encountered and a considerable length of time is required until the internal temperature of the vehicle compartment is adjusted to a comfortable level when the number of occupants changes or the condition of radiation of daylight changes.

SUMMARY OF THE INVENTION

It is an object of the present invention to provide a novel and improved automatic air-conditioning apparatus for a vehicle in which a temperature display unit is provided, and a microcomputer is used to control the conditioning of air in the vehicle compartment.

Another object of the present invention is to provide an automatic air-conditioning apparatus whose air-conditioning function is controlled by a microcomputer and which includes a temperature display unit which displays normally the internal air temperature but is switched over to display a selected temperature setting for a predetermined period of time only when a temperature setting unit is manipulated.

In the automatic air-conditioning apparatus according to the present invention, its temperature display system and its air-conditioning control system are both controlled by a microcomputer. The temperature display system includes a temperature setting unit and a temperature display element. The temperature display element displays normally the internal air temperature but displays a selected temperature setting for a predetermined period of time only when a temperature setting unit is manipulated. The microcomputer includes means for carrying out such a manner of control.

Input data such as temperature data making a slow or gradual change are not applied to the microcomputer during each period of a main flow of control by the microcomputer but applied normally at internals of a relatively long period of time which is several times as long as the period of the main flow. On the other hand, such input data are applied to the microcomputer at intervals of a short period of time only when a substantial change occurs in the input data. By the employment of such a control technique, the frequency of input data application requiring generally a long time for processing can be reduced without in any way impeding the control by the microcomputer, so that the air-conditioning control by the microcomputer can be carried out efficiently.

DESCRIPTION OF THE PREFERRED EMBODIMENTS

Figure 1:
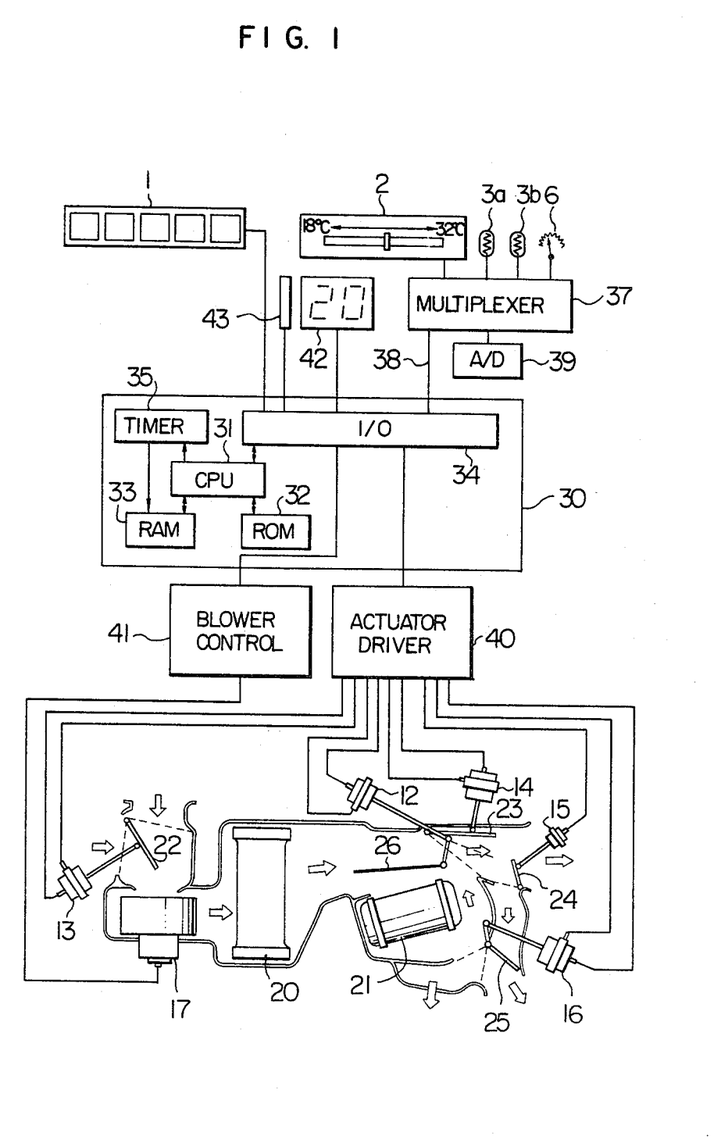
FIG. 1 is a diagrammatic view showing generally the construction of a preferred embodiment of the automatic air-conditioning apparatus for a vehicle according to the present invention.

Referring now to FIG. 1 showing generally the construction of a preferred embodiment of the automatic air-conditioning apparatus for a vehicle according to the present invention, the apparatus includes a mode setting unit or a mode selector switch array 1, a temperature setting unit 2 for setting, as desired, the internal air temperature of the compartment of the vehicle by manipulation of a temperature lever 4, an internal air temperature sensor 3a, an external air temperature sensor 3b, a feedback potentiometer 6 for sensing the opening of an air mixing door 26 described later, a power servo 12 for regulating the opening of the air mixing door 26, actuators 13, 14, 15 and 16 for regulating the angular positions of various air distributing doors such as an air intake door 22, a vent door 23, a bypass door 24 and a floor door 25 respectively, a blower motor 17, an evaporator 20 and a hot-water heater 21. The blower motor 17, power servo 12 and actuators 13–16 are electrically controlled by a microcomputer 30 (a 4-bit microcomputer Model HD44750 manufactured by Hitachi, Ltd. in Japan) via an actuator driver circuit 40 and a blower control circuit 41, without the use of the prior art vacuum supply piping. This microcomputer 30 includes a central processing unit (CPU) 31, a read-only memory (ROM) 32, a random access memory (RAM) 33, an input-output unit (I/O) 34 and a timer 35 therein. The mode setting unit or mode selector switch array 1 is of the type capable of generating digital output data and is connected directly to the microcomputer 30. A multiplexer 37 is connected by way of a control line 38 to the microcomputer 30 to be controlled by the microcomputer 30. Analog output signals from the temperature setting unit 2, internal air temperature sensor 3a, external air temperature sensor 3b and feedback potentiometer 6 are applied through the multiplexer 37 to an A/D converter 39 to be converted into digital data which are applied to the microcomputer 30. A digital temperature display element 42 displays normally the internal air temperature of the vehicle compartment. However, when the temperature level 4 is manipulated to indicate a new temperature setting on the temperature setting unit 2, a temperature setting status indicator or setting lamp 43 is energized temporarily, and at the same time, the temperature display element 42 displays such a temperature setting. Upon lapse of a predetermined period of time (for example, 2.6 sec) after the selection of the new temperature setting by the manipulation of the temperature lever 4, the temperature display element 42 displays now the internal air temperature again.

Figure 2:
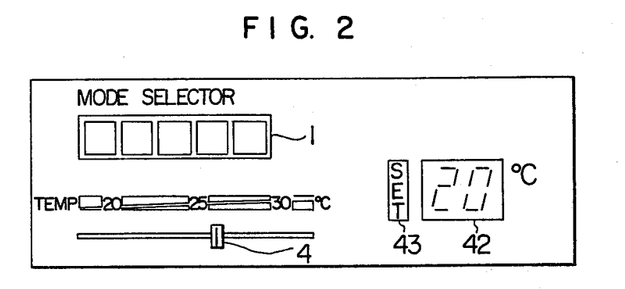
FIG. 2 is a front elevation view of a manipulator panel in the automatic air-conditioning apparatus shown in FIG. 1.

FIG. 2 is a front elevation view of a manipulator panel in the apparatus shown in FIG. 1. It will be seen that the mode selector switch array 1, temperature lever 4, temperature display element 42 and setting lamp 43 are mounted on this panel. A temperature scale indicating the temperature values at intervals of 5° C. is disposed above the temperature lever 4 so that any desired temperature setting within the illustrated range can be selected by shifting the temperature lever 4. The setting lamp 43 is kept energized for a predetermined period of time of, for example, 2.6 sec in response to the selection of a new temperature setting by the manipulation of the temperature lever 4 to indicate that the temperature being displayed on the temperature display element 42 is the temperature setting selected by the manipulation of the temperature lever 4.

Figure 3:
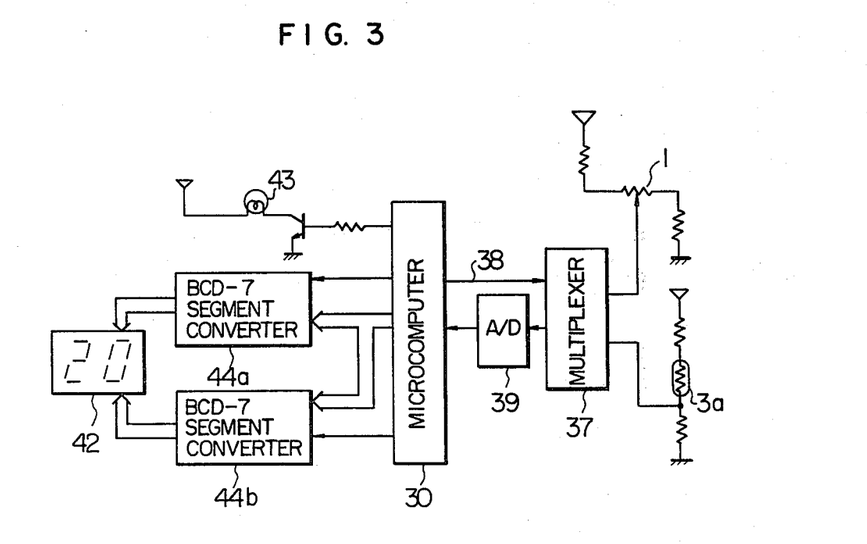
FIG. 3 is a block diagram of the temperature display system in the automatic air-conditioning apparatus shown in FIG. 1.

FIG. 3 is a block diagram of the temperature display system in the apparatus shown in FIG. 1, and the same reference numerals are used to designate the same parts appearing in FIG. 1. In FIG. 3, 44a and 44b designate BCD-7 segment converters through which the temperature is digitally displayed on the temperature display element 42.

As described hereinbefore, the automatic air-conditioning apparatus embodying the present invention has the function of selectively displaying the temperature setting and the internal air temperature under control of the microcomputer 30. All the functions of the microcomputer 30 including such a temperature display function are achieved according to a main flow chart which shows the steps of controlling the automatic air-conditioning apparatus shown in FIG. 1 by the microcomputer 30.

Figure 4:
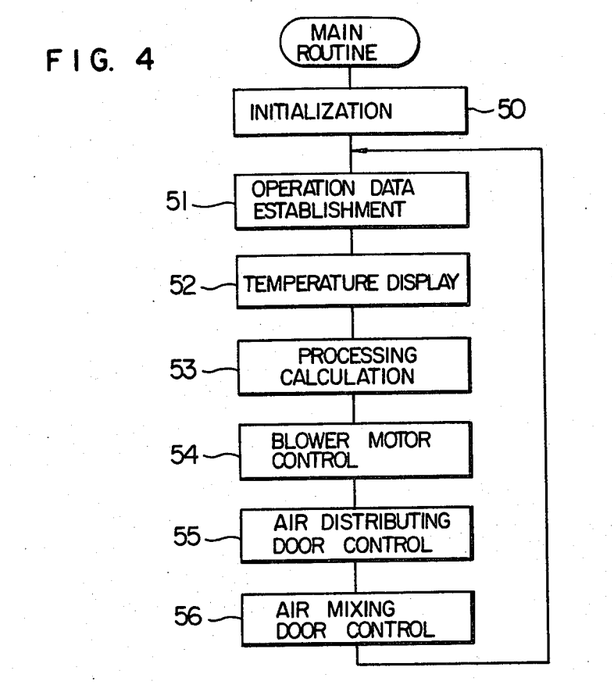
FIG. 4 is a main flow chart of control in the automatic air-conditioning apparatus shown in FIG. 1.

Step 50 in FIG. 4 is an initializing step in which the RAM 33 is cleared, the I/O 34 is set in the system shutdown mode, etc. Step 51 is one of the important features of the present invention, and in this step 51, a timer interrupt routine described in detail later is run interrupting the main flow shown in FIG. 4. In step 51, the analog information data outputs from the internal air temperature sensor 3a, external air temperature sensor 3b and feedback potentiometer 6 are applied to the microcomputer 30 through the multiplexer 37 and A/D converter 39. The temperature setting data output from the temperature setting unit 2 is also applied to the microcomputer 30, together with the mode information output applied from the mode selector switch array 1 to the microcomputer 30 directly. These input data are established as control data to be used in the later steps of control.

In step 52, the internal air temperature is normally displayed on the temperature display element 42, but, when the temperature lever 4 is manipulated, the setting lamp 43 is temporarily energized, and the selected temperature setting is displayed on the temperature display element 42 in lieu of the internal air temperature. In step 53, necessary calculations are carried out in the microcomputer 30 to determine the voltage to be applied to the blower motor 17, the angular positions of the various doors 22, 23, 24, 25 and the opening of the air mixing door 26 on the basis of the inputs indicative of the temperature setting Ts, internal air temperature Tr and external air temperature Ta. In step 54, the blower motor 17 is controlled by the blower control circuit 41 depending on the result of calculations carried out in step 53. In step 55, control signals are applied to the individual actuators 13, 14, 15 and 16 to control the angular positions of the air distributing doors 22, 23, 24 and 25 to meet the specific mode selected by the mode selector switch array 1. In step 56, the power servo 12 is controlled to control the opening of the air mixing door 26. The microcomputer 30 repeats the above steps for conditioning air and displaying the temperature.

Figure 5:
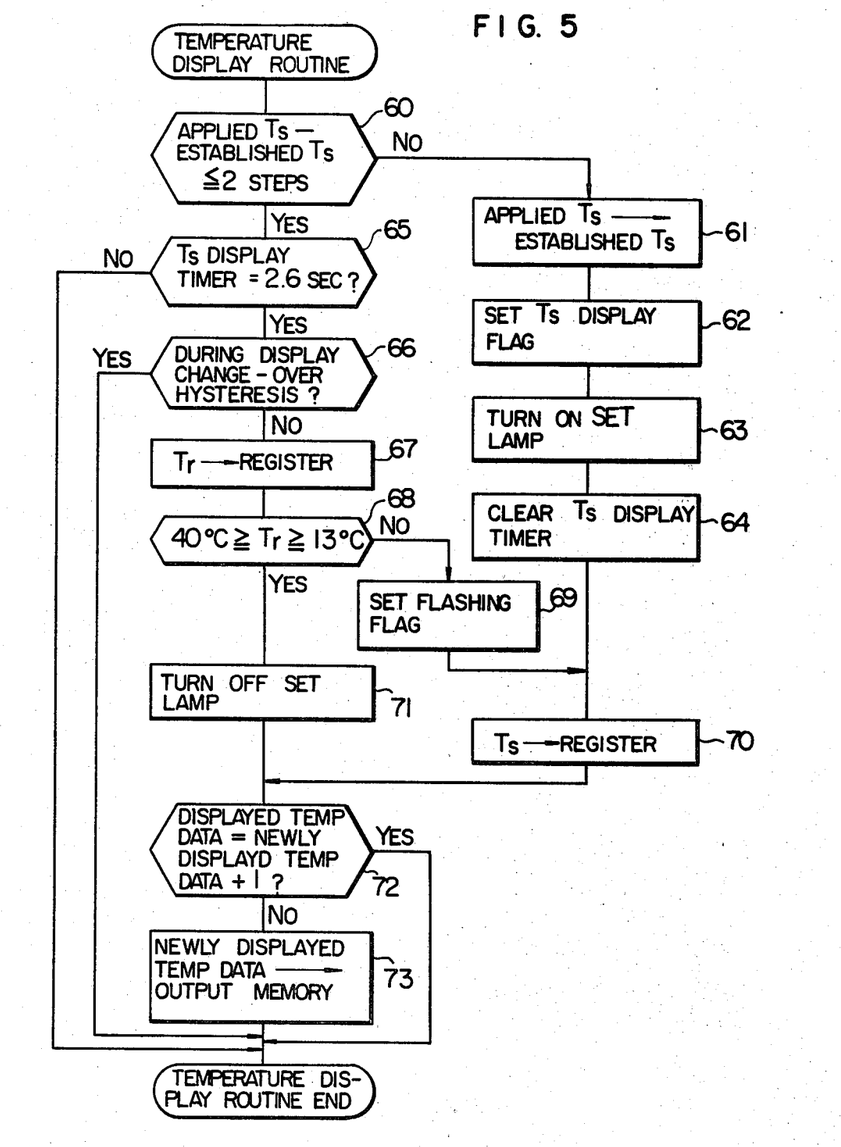
FIG. 5 is a flow chart showing in detail the step of temperature display in the main flow chart shown in FIG. 4.

FIG. 5 is a detailed flow chart of a temperature display routine run in the temperature display step 52 shown in FIG. 4. According to this flow chart, the function of displaying the internal air temperature on the temperature display element 42 is achieved, and also, the function of displaying the selected temperature setting on the temperature display element 42 and energizing the setting lamp 43 for the predetermined period of time is achieved when the temperature lever 4 is manipulated.

In step 60, the new temperature setting data Ts provided by the manipulation of the temperature lever 4 is applied to the microcomputer 30 to be compared with the previous temperature setting data Ts established already as the operation data before the application of the former data so as to judge whether or not the temperature setting to be displayed should be changed over to the new value. That is, judgement is made to find whether or not the difference between the former and latter temperature setting data Ts is less than or equal to two steps. In the embodiment of the present invention, one step is selected to be about 0.22° C. Therefore, judgment is made to find whether or not the difference therebetween is less than or equal to 0.44° C. This is because an input error during the A/D conversion by the A/D converter 39 may result in a change of the temperature setting data Ts over one or two steps even when the temperature lever 4 is not manipulated, and such a change is ignored in the present invention when it lies within the range of two steps or 0.44° C. When the difference between the former and latter temperature setting data Ts is found to be more than two steps (=0.44° C.), step 60 is followed by step 61 so that the new temperature setting Ts should now be displayed on the temperature display element 42.

In step 61, the new temperature setting data Ts provided by the manipulation of the temperature lever 4 replaces the previous data Ts stored in a predetermined region of the RAM 33 and is stored as an established data Ts to be displayed as the temperature setting. In step 62, a Ts display flag is set in the RAM 33. In step 63, the setting lamp 43 is energized to indicate that the new temperature setting Ts is displayed now, and a setting lamp "on" flag is set in the RAM 33. Step 63 is followed by step 64 in which the timer timing the period of time of displaying the temperature setting Ts is cleared upon lapse of 2.6 sec.

When, on the other hand, the result of judgment in step 60 is "YES", judgment is then made in step 65 as to whether or not the Ts display timer has counted the number corresponding to the period of time of 2.6 sec for an expected interrupt. When the result of judgment in step 65 is "NO", the situation indicates one of the three cases described below. In one of the cases, the temperature lever 4 is now being manipulated, and in the second case, the period of time of 2.6 sec has not yet elapsed after the manipulation of the temperature lever 4. In the third case, the internal air temperature Tr exceeds a predetermined input data range and the temperature setting Ts is displayed with the setting lamp 43 being repeatedly turned on-off or intermittent flashing. In any one of such three cases, the temperature display routine is discontinued so as to continue to display the temperature setting Ts. When it is proved that the period of time of 2.6 sec has already elapsed, step 65 is followed by step 66 so as to display the internal air temperature Tr according to a timer interrupt routine described later.

In step 67 following step 66, the internal air temperature data is written in a predetermined region of the RAM 33 so as to display the internal air temperature Tr. In step 68, judgment is made as to whether or not the internal air temperature Tr exceeds the predetermined input data range, that is, whether or not the internal air temperature Tr lies within the range of 40° C. and 13° C. When the result of judgment in step 68 is "NO", a lamp on-off or intermittent flashing flag is set in the RAM 33 in step 69 so as to display the temperature setting Ts while causing the flashing of the setting lamp 43. Thus, a hysteresis control is carried out to prevent such a situation in which the displayed temperature setting Ts may not be distinguished from the displayed internal air temperature Tr at a critical temperature at which quick alternative display of the former Ts and the latter Tr occurs. For this purpose, the Ts display timer is cleared in step 64, and, in step 70, the temperature setting data Ts is written in the predetermined region of the RAM 33 storing the BCD data for display.

When, on the other hand, the result of judgment in step 68 is "YES", the setting lamp 43 is deenergized, and the setting lamp "on" flag is reset in step 71, since the internal air temperature Tr is now displayed. In step 72, unity (1) is added to the value of the BCD data stored in the RAM 33, and judgment is then made as to whether or not the resultant data coincides with the BCD data presently displayed. When the result of judgment is "YES", the temperature display routine is discontinued to prevent such a situation in which the displayed temperature fluctuates between, for example, 19° C. and 20° C. due to an input data error. In this case, the difference of 1° C. is ignored. When, on the other hand, the result of judgment in step 72 is "NO", the BCD data stored in the RAM 33 to be displayed is applied to the BCD-7 segment converter 44a so as to display the temperature, and that data is written in the BCD data memory.

Upon completion of the aforementioned temperature display routine run in step 52, this step 52 is followed by step 53.

According to the temperature display control flow above described, the internal-air temperature Tr is normally displayed on the temperature display element 42, and the temperature setting Ts set by the manipulation of the temperature lever 4 is displayed for about 2.6 sec subsequent to the manipulation of the lever 4. Further, even when the internal air temperature Tr exceeds the predetermined input data range, the temperature setting Ts can be displayed while causing the flashing of the setting lamp 43.

As described hereinbefore, the step 51 of operation data establishment in the main flow shown in FIG. 4 is carried out according to an interrupt routine. In the execution of the main flow, a greater proportion of time is consumed for the A/D conversion of various analog data which are converted into digital data to be applied to the microcomputer 30. More precisely, a processing period of time of about 60 msec is required for completely running the main flow, and a period of time of 40 msec to 45 msec in the above period of time of 60 msec is occupied by the A/D conversion of analog data into digital data. However, temperature data may not change so abruptly, and such a change will not occur during at least the period of 60 msec. Therefore, temperature data newly obtained may be compared with a previous temperature data obtained immediately before and may be re-applied in a short period of time of, for example, about 10 msec only when there is a substantial difference therebetween, so that the change in the input data can be confirmed. When, on the other hand, there is not any substantial change in the input data, the step 51 of operation data establishment may be carried out at internals of a relatively long period of time of, for example, 200 msec. In the present invention, temperature data are continuously applied to the microcomputer 30 during a short period of time when there is a substantial change in the input data, and when two consecutive temperature data coincide with each other, such a data is regarded to be a true input data. This manner of data identification prevents the possibility of application of error inputs such as an impulsive noise input having a pulse width ranging from several ten $\mu$sec to several hundred $\mu$sec.

Figure 6:
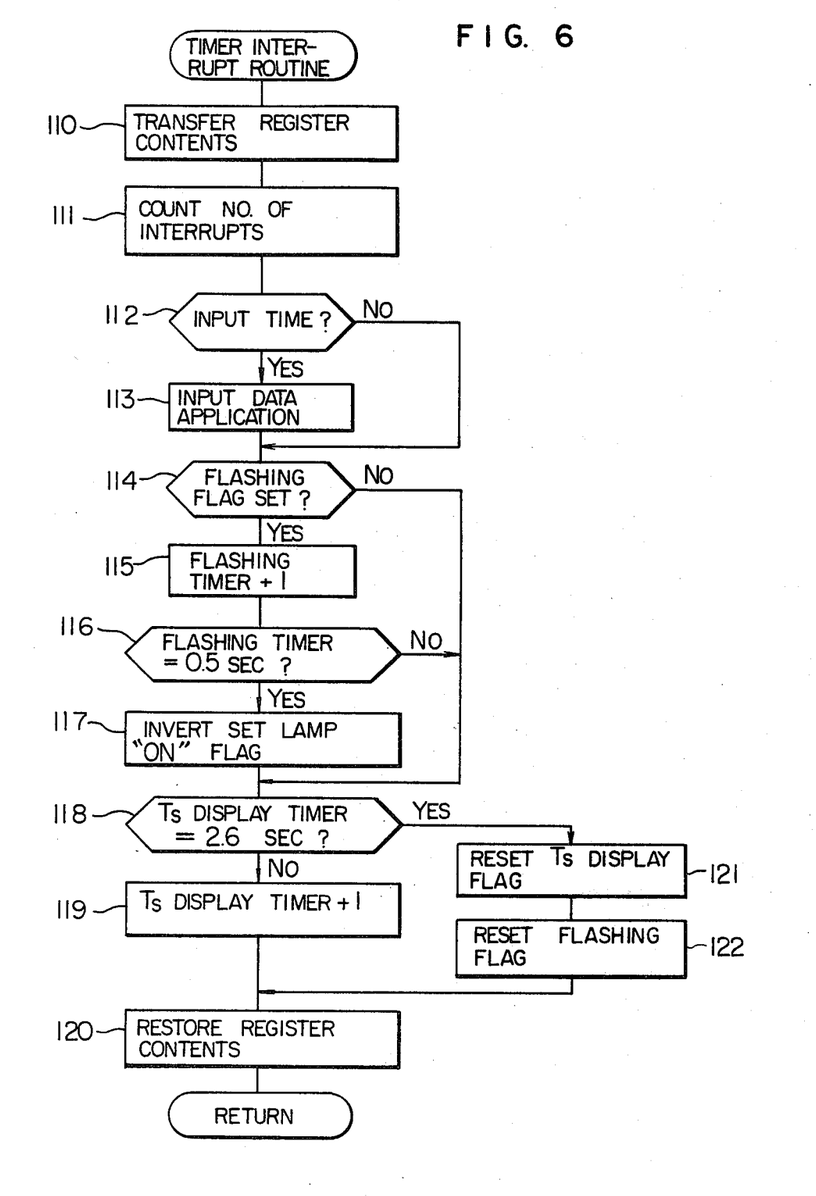
FIG. 6 is a flow chart of a timer interrupt routine run in connection with the main flow chart shown in FIG. 4.

A timer interrupt routine is run for the establishment of the operation data in the embodiment of the present invention. For the purpose of running this timer interrupt routine, the system clock pulses used for the timed operation of the microcomputer 30 are counted by the timer 35 until an overflow occurs so as to utilize the overflow for running the routine. The timer interrupt routine is run at intervals of a predetermined constant period of about 10 msec. FIG. 6 shows the flow of this timer interrupt routine. Upon request for this timer interrupt routine, the main flow is interrupted, and the flow shown in FIG. 6 takes place.

In step 110 in FIG. 6, the contents of various registers in the microcomputer 30 are transferred to predetermined regions of the RAM 33 for standing by, and immediately before the end of the interrupt routine, these register contents are read out or restored in step 120, so that the steps of the main flow temporarily interrupted can then be continued.

In step 111, a memory in the RAM 33 provided for counting the number of interrupts (10 msec per interrupt). In the embodiment of the present invention, input data are applied at intervals of 200 msec which corresponds to 20 interrupts. In step 112, judgment is made as to whether or not the number of interrupt units attains the value of 20. When the result of judgment in step 112 proves that the number of interrupt units attains the value of 20, an input data is applied in a manner as will be described in detail with reference to FIG. 7. For example, a resistance data indicative of the temperature set by the manipulation of the temperature lever 4 is applied.

Figure 7:
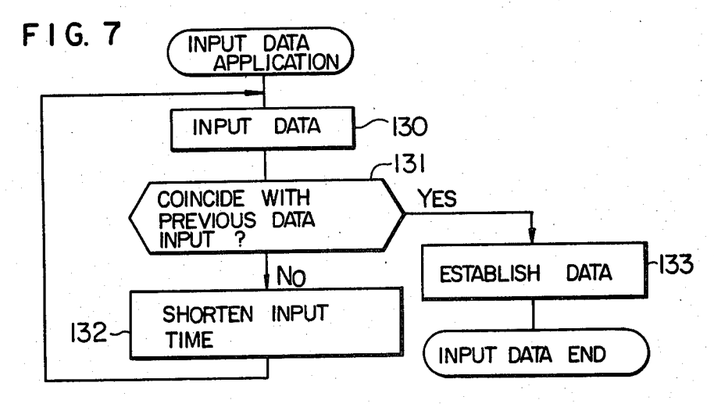
FIG. 7 is a flow chart showing in detail the step of input data application in the flow chart shown in FIG. 6.

In step 130 in FIG. 7, the input data is applied through the A/D converter 39 to the microcomputer 30 and is written in a predetermined region of the RAM 33 to be compared in step 131 with an input data previously applied and stored in another predetermined region of the RAM 33. When there is no coincidence therebetween, the former data is caused to stand by in step 132 to the region in which the previously applied data has been stored, so as shorten the data input time. In this step 132 of data input time shortening, the initial count of the input-time counting timer is set at 190 msec. When, on the other hand, coincidence of the newly applied input data with the previously applied input data is found in step 131, the latter data stored already in the predetermined region of the RAM 33 is selected as the established reference data Ts which is used as the operation data in the main flow.

In step 114 in FIG. 6, judgment is made as to whether or not the internal air temperature Tr of the vehicle compartment exceeds the predetermined input range and a lamp intermittent flashing flag is set in the RAM 33. When the result of judgment in step 114 proves that flashing of the setting lamp 43 is required, a lamp intermittent flashing timer counts up in step 115, and, in step 116, judgment is made as to whether or not the timer has counted the number of interrupts corresponding to a period of time of 0.5 sec. When the result of judgment in step 116 is "YES", the setting lamp "on" flag is inverted in step 117 so as to deenergize the setting lamp 43 when it is in the energized state or to energize the setting lamp 43 when it is in the deenergized state. In step 118, judgment is made as to whether or not the timer timing the time interval for continuously displaying the temperature setting Ts on the temperature display element 42 for the period of time of 2.6 sec has timed 2.6 sec. When the result of judgment in step 118 is "No", the timer counts up in step 119 which is followed by the aforementioned step 120. When, on the other hand, the result of judgment in step 118 is "YES", the Ts display flag is reset in step 121 so as to discontinue displaying of the temperature setting Ts on the temperature display element 42. In step 122, the lamp flashing flag indicative of the lamp on-off hysteresis due to the overscale of the internal air temperature Tr is reset, and the routine proceeds to the aforementioned step 120. In step 120, the register contents having been transferred to the predetermined regions of the RAM 33 in step 110 are read out or restored to continue the main flow.

It will be understood from the above explanation of the interrupt routine that input data making normally a gradual or slow change are applied at time intervals of about 200 msec but are applied at short time intervals of about 10 msec only when a substantial change in the input data is sensed. Employment of such a data processing technique can reduce the number of input data applications without any hindrance to the required temperature control and can therefore shorten the length of time required for data processing, by the microcomputer.

We claim:

1. An automatic air-conditioning apparatus comprising:
    at least one temperature sensor;
    a temperature setting unit for setting a desired temperature;
    a temperature display element for selectively displaying the temperature sensed by said temperature sensor and the temperature setting set by said temperature setting unit; and
    a microcomputer carrying out necessary calculations for the purpose of temperature control and temperature display on the basis of the output signals from said temperature sensor and said temperature setting unit, said microcomputer including first means for displaying the temperature setting for a predetermined period of time on said temperature display element when said temperature setting unit is manipulated and second means for inhibiting said first means from displaying the temperature setting on said temperature display element until the difference between a temperature setting data resulting from manipulation of said temperature setting unit and the presently established temperature setting data established already as operation data exceeds a predetermined value.

2. An automatic air-conditioning apparatus as claimed in claim 1, further comprising a temperature setting status indicator which is energized when the temperature setting is displayed on said temperature display element.

3. An automatic air-conditioning apparatus as claimed in claim 1, wherein said microcomputer includes timer interrupt means for changing over between the display of the temperature setting set by said temperature setting unit and the display of the temperature sensed by said temperature sensor.

4. An automatic air-conditioning apparatus as claimed in claim 1, wherein said microcomputer includes means for displaying the temperature setting on said temperature display element when the temperature sensed by said temperature sensor does not lie within a predetermined temperature range.

5. An automatic air-conditioning apparatus as claimed in claim 1, wherein said microcomputer includes means for monitoring the output signals from said temperature sensor and said temperature setting unit at time internals of a predetermined relatively long period of time, and means for re-applying said output signals at time intervals of a short period of time for confirming a substantial change in said output signals only when such a change occurs in said output signals.

6. An automatic air-conditioning apparatus as claimed in claim 5, wherein a timer interrupt routine is run for monitoring said output signals at the relatively long time interval.

7. An automatic air-conditioning apparatus as claimed in claim 5, wherein said means for confirming a substantial change in said output signals at the short time interval identifies the established data when two consecutive input data applied at said short time interval coincide with each other.

8. An automatic air-conditioning apparatus as claimed in claim 5, wherein said relatively long time interval is several times as long as the total period of the main flow of control by said microcomputer.

9. An automatic air-conditioning apparatus for an automotive vehicle comprising:
  an internal air temperature sensor sensing the internal air temperature of the compartment of the vehicle;
  an external air temperature sensor sensing the temperature of external air;
  a temperature setting unit for setting a desired internal air temperature;
  a temperature display element for normally displaying the internal air temperature but displaying the temperature setting when the internal air temperature is set by said temperature setting unit;
  a temperature setting status indicator energized when the temperature setting set by said temperature setting unit is displayed on said temperature display element; and
  a microcomputer carrying out necessary calculations for the purpose of temperature control and temperature display on the basis of the output signals from said internal air temperature sensor, said external air temperature sensor and said temperature setting unit, said microcomputer including first means for displaying the temperature setting on said temperature display element for a predetermined period of time when said temperature setting unit is manipulated, second means for inhibiting said first means from displaying the temperature setting on said temperature display element until the difference between a temperature setting data resulting from manipulation of said temperature setting unit and the presently established temperature setting data established already as operation data exceeds a predetermined value and third means for energizing said temperature setting status indicator, when the temperature setting is displayed on said temperature display element.

10. An automatic air-conditioning apparatus comprising:
  at least one temperature sensor;
  a temperature setting unit for setting a desired temperature;
  a temperature display element for selectively displaying the temperature sensed by said temperature sensor and the temperature setting set by said temperature setting unit;
  a temperature setting status indicator which is energized when the temperature setting is displayed on said temperature display element; and
  a microcomputer carrying out necessary calculations for the purpose of temperature control and temperature display on the basis of the output signals from said temperature sensor and said temperature setting unit, said microcomputer including means for displaying the temperature setting for a predetermined period of time on said temperature display element when said temperature setting unit is manipulated, and means for causing intermittent flashing of said temperature setting status indicator when the temperature sensed by said temperature sensor does not lie within a predetermined temperature range.

* * * * *